(No Model.)
E. T. GILLILAND.
MAGNETO GENERATOR.
No. 538,329.  Patented Apr. 30, 1895.
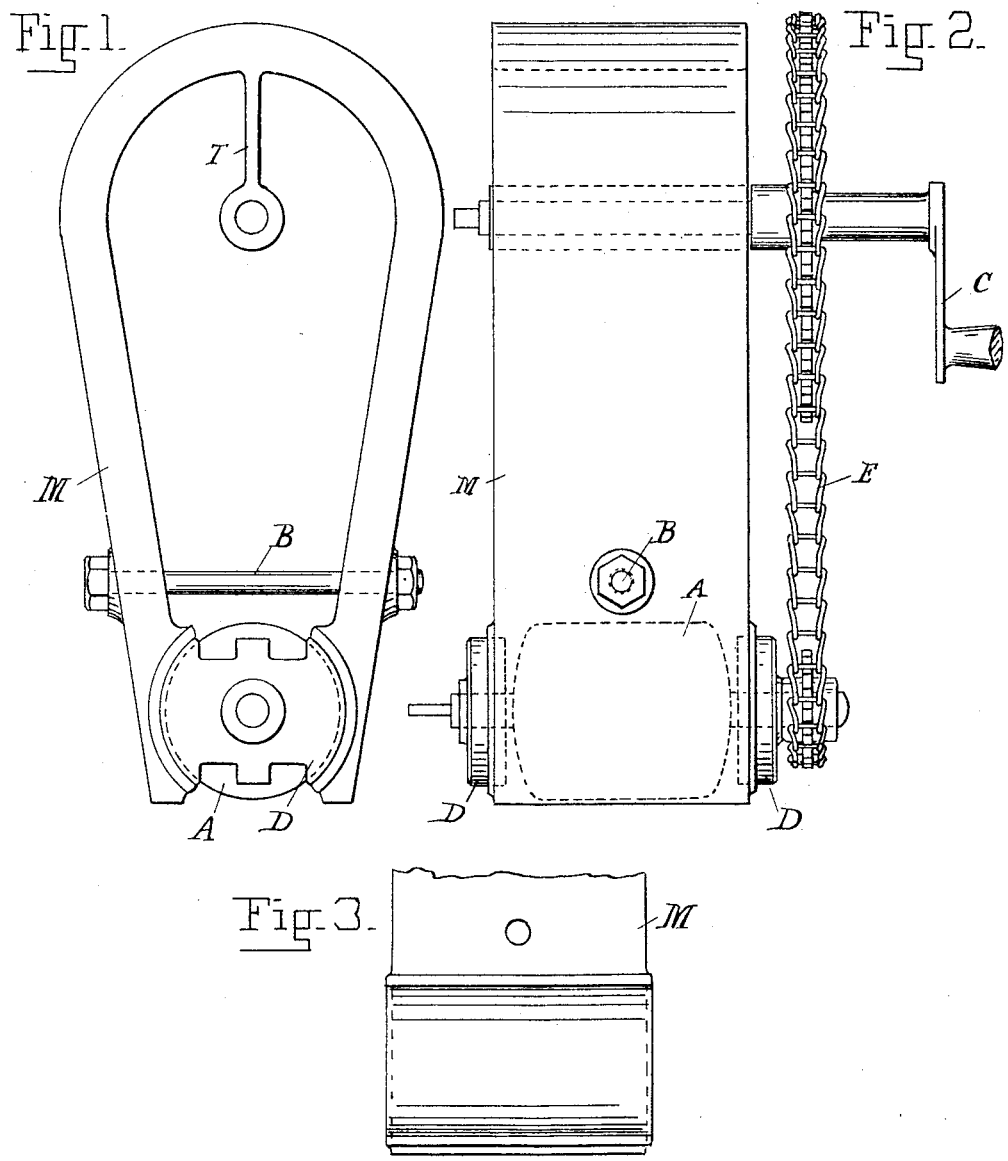
Witnesses:
Samuel W. Balch
[signature]
Inventor,
Ezra T. Gilliland
By Thomas Ewing, Jr.,
Attorney

UNITED STATES PATENT OFFICE.

EZRA T. GILLILAND, OF PELHAM MANOR, NEW YORK, ASSIGNOR TO THE AMERICAN BELL TELEPHONE COMPANY, OF BOSTON, MASSACHUSETTS.

MAGNETO-GENERATOR.

SPECIFICATION forming part of Letters Patent No. 538,329, dated April 30, 1895.

Application filed November 28, 1894. Serial No. 530,218. (No model.)

*To all whom it may concern:*

Be it known that I, EZRA T. GILLILAND, a citizen of the United States of America, residing at Pelham Manor, county of Westchester, State of New York, have invented certain new and useful Improvements in Magneto-Generators, of which the following is a specification.

My invention consists in a magneto generator capable of being actuated manually, having the field magnet and pole pieces in one piece and casting; and having also the bushings which form the armature bearings mounted between the pole pieces and there secured by means of the resiliency and elasticity of the magnet, the legs of which may be sprung apart for the admission of the said bearing plates, and which tend strongly to come back to their original position and thereby grasp tightly the said plates. As a further means of holding the parts securely in place, a clamping screw, or bolt may be provided, which passes through both legs of the magnet and holds them in position, when otherwise in the event of a jar, or other strain certain of the parts might be liable to displacement. By such a construction I have succeeded in effecting a large reduction in the number of component parts of the machine, thereby eliminating many complicated details, and producing a machine of great simplicity of construction; and I succeed moreover by the simple expedient of securing the bushings between the magnet poles in obtaining an accurate alignment and centering of the bearings of the armature, an operation which heretofore has involved a much larger amount of work and expense.

Referring now to the drawings which accompany this specification, Figure 1 is an end elevation of the machine. Fig. 2 is a side elevation thereof. Fig. 3 is a detail showing the face of the pole piece.

In constructing the machine, I provide a frame M preferably of cast iron, which, as shown, is generally in the form of a horse shoe, is magnetized to constitute the field magnet of the machine, and carries at its ends, and is in one piece with, two rounded faces turned inward toward each other to form the pole pieces. In the construction I prefer, a suitable bracket T carrying at its outer end a bearing for the driving shaft of the actuating mechanism is provided. This bracket may conveniently be cast in one piece with the frame or field magnet, and, as shown extend inwardly from the middle of the arch, or neutral point thereof and is enlarged at its end so as to accommodate the shaft bearing. The said bracket may however be separable and screwed, or attached in any other desired way to the frame; or may even be altogether dispensed with, in which case the shaft may be journaled or supported in a bearing formed in one leg of the magnet or frame. The armature A is supported in the cylindrical space between the pole pieces by bearings centrally bored in bushings D D. These bushings, as shown in Fig. 1, fit between the pole pieces of the frame M. The faces of the pole pieces are turned smooth, and each presents a uniform face throughout, forming a portion of the internal surface of a hollow cylinder as clearly shown in Fig 3. The armature A, the axis of which is supported by the bushings, has of course a slightly smaller diameter than that of the said bushings as indicated in Fig. 1. The bearing of each bushing is provided with an oil well.

On the axis of the armature, as shown at the right of Fig. 2, is mounted an actuating mechanism comprising, as shown, a sprocket wheel over which runs a chain belt E which engages with a larger sprocket wheel mounted on the shaft of the crank C. Any other ordinary actuating mechanism, such as large and small pulleys and belt; friction wheel and pinion, or simple gearing may however, if desired, be substituted for the said sprocket wheels and chain.

The electrical connections of the machine are not shown, but may be any desired, to suit the particular purpose for which the machine is to be used. The mode of winding the armature is not important, and any desired winding may be adopted.

When the bearing bracket is integral with the said frame, it necessarily is also of magnetic material, but projecting from the neutral point of the magnet, the magnetic leakage is insignificant and negligible.

To assemble the machine, the bushings D

D in which is hung the armature A, are inserted in place between the pole pieces of the frame M, the legs thereof being sprung apart to admit them. When so placed they are securely held in position by the resiliency of the said legs of the magnet which tend to re-approximate themselves; but to more permanently secure them against displacement by jar or violence, a bolt or clamping screw B may be introduced in holes drilled through the two legs of the frame M, and a nut screwed on the end thereof, whereby the said legs of the frame are drawn and held together as tightly as is requisite to prevent the possible displacement of the bushings and armature.

The bolt B, the bushings D D, and the axis of the armature are all made preferably of non-magnetic material.

The manner of mounting the actuating mechanism is obvious, when reference is made to the drawings.

As will readily be seen from the foregoing description the only machine operations aside from the production of the armature and driving mechanism are, drilling the hole for the shaft bearing, boring out the polar cavity at the faces of the pole pieces, drilling a hole at right angle thereto to receive the clamping bolt or screw, and turning and boring the bushings to fit the polar cavity, and to provide bearings for the armature shaft or axle.

What I claim, and desire to secure by Letters Patent of the United States, is—

1. A frame of magnetic material having a bracket provided with a support for the shaft of a driving wheel, and two legs which carry pole pieces on their ends, the whole being a single casting, substantially as described.

2. A magneto generator consisting of a magnet and pole pieces in one casting or piece; a generating armature; bearings therefor mounted between the pole pieces, and secured in position by the resiliency of the magnet; and actuating mechanism; substantially as described.

3. A magneto generator consisting of a magnet and pole pieces in a single casting; an armature; armature bearings mounted between the pole pieces; a driving shaft journaled in or supported by the magnet; armature rotating mechanism actuated thereby; and a clamping bolt or screw for clamping the bearing plates of the said armature and holding them in place, substantially as described.

4. A magneto generator, consisting of a magnet, pole pieces and a bracket in one casting, a driving shaft supported in the bracket; driving mechanism; an armature; armature bearings mounted between the pole pieces; and a clamping screw for clamping the bearings and holding them in position, substantially as described.

Signed by me this 20th day of November, 1894.

EZRA T. GILLILAND.

Witnesses:
A. W. SKINNER,
LILLIAN GILLILAND.